United States Patent [19]

Germann

[11] 4,251,680
[45] Feb. 17, 1981

[54] ELECTRICAL LEAD-THROUGH APPARATUS

[75] Inventor: Willy Germann, Würenlos, Switzerland

[73] Assignee: BBC Brown, Boveri & Company, Limited, Baden, Switzerland

[21] Appl. No.: 4,867

[22] Filed: Jan. 19, 1979

[30] Foreign Application Priority Data

Jan. 25, 1978 [CH] Switzerland .................... 791/78

[51] Int. Cl.³ .......................................... H01B 17/30
[52] U.S. Cl. ..................................... 174/18; 174/151; 277/26
[58] Field of Search .................... 174/18, 151, 152 R, 174/152 S, 152 E; 277/26; 403/28, 29, 30; 313/144; 310/71

[56] References Cited

U.S. PATENT DOCUMENTS

| | | | |
|---|---|---|---|
| 2,312,909 | 3/1943 | Jeffery | 174/152 S X |
| 3,254,154 | 5/1966 | Boggs | 313/144 X |
| 3,263,025 | 7/1966 | Wheeler | 174/18 X |
| 3,433,506 | 3/1969 | Crowe | 277/26 X |

FOREIGN PATENT DOCUMENTS 122654 2/1919 United Kingdom .................... 313/144

*Primary Examiner*—Laramie E. Askin
*Attorney, Agent, or Firm*—Burns, Doane, Swecker & Mathis

[57] ABSTRACT

An arrangement for mounting lead-through conductors is disclosed. A ceramic plate is sealed between two steel flanges. The conductors pass through the ceramic plate and are sealed on both sides. When one side of the plate is exposed to high pressure, low temperature gas, and the other side of the plate is exposed to high vacuum at a higher temperature, the plate is protected from excessive stresses by providing gaskets on one side of the ceramic plate having a different coefficient of thermal expansion than the gaskets on the other side of the ceramic plate.

8 Claims, 1 Drawing Figure

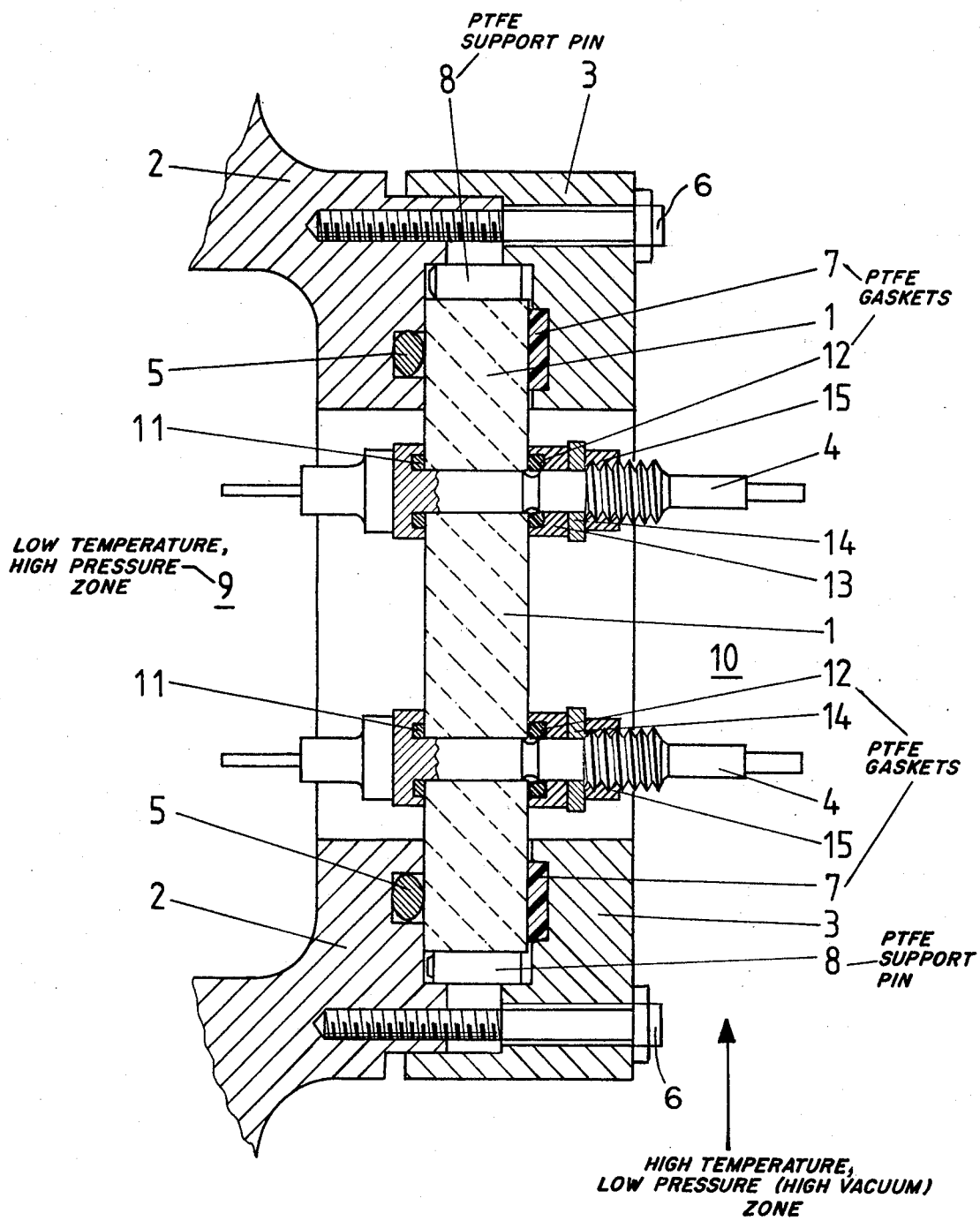

ELECTRICAL LEAD-THROUGH APPARATUS

BACKGROUND OF THE INVENTION

This invention relates to electrical lead-through installations, and more particularly to electrical lead-through arrangements for applications where large pressure and temperature differentials are present.

In various apparatus that are currently in use, electrical conductors are required to pass through a wall having large pressure or temperature differentials, and it is necessary to provide an effective electrical insulation around the conductor, as well as sealing against heat loss and pressure loss around the conductor. An example of apparatus in which this presents a problem is a turbogenerator with a superconductive excitation winding, such as that disclosed in a paper entitled "Turbogeneratoren mit supraleitender Erregerwickung," published in "Bull.Sev" 64 (1973) 17, 18 August, pages 1040 to 1050, in FIG. 3 on page 1043. The excitation winding is cooled by liquid helium. The cold rotor body carrying the winding is located inside an outer, warm cylinder, and a high vacuum is generated in the space between the rotor body and the cylinder. The mounting of the inside rotor body and the transfer of torque to the shaft ends, which are at room temperature, is accomplished by thin fittings which are cooled additionally by means of helium. A helium carrier, rotating vacuum seals and slip rings are located at the non-driven ends of the shaft. Lead-in wires for the excitation current are arranged inside the shaft and passed from the high vacuum chamber into a chamber containing the pressurized helium. Lead-through conductors are mounted in ceramic plates which separate the high vacuum chamber from the low temperature pressurized helium chamber. As a result, the mounting arrangement is subjected to high stresses because the two chambers have very low temperatures and are under dissimilar pressures. Also, the lead-through conductors are subjected to centrifugal forces as the rotor body rotates.

Accordingly, it is an object of this invention to provide a mounting arrangement for lead-through conductors which is capable of operating properly under conditions of large pressure differentials and temperature differentials and while subjected to centrifugal forces.

SUMMARY OF THE INVENTION

In accordance with this invention, an arrangement is provided for electrical lead-through conductors wherein the conductors pass through a ceramic plate which is clamped between metallic flanges. On the high pressure side, gaskets are provided between the flanges and the ceramic plate. These gaskets are formed of a material that has substantially the same rate of thermal expansion as the metallic flanges. Gaskets are also provided on the high vacuum side and these gaskets are made of a material that has a relatively large rate of thermal expansion to compensate for the relatively small thermal expansion rate of the ceramic plate.

DESCRIPTION OF THE DRAWINGS

A preferred embodiment of the invention is illustrated in the accompanying drawing, which is a cross-sectional view of the lead-through conductor mounting arrangement in accordance with this invention.

DESCRIPTION OF THE PREFERRED EMBODIMENT

For the purpose of illustration of the invention, a circular ceramic plate 1 is illustrated in the drawing as clamped between two steel flanges 2 and 3. These steel flanges are also circular and are secured together by bolts 6. The ceramic plate 1 is preferably formed of aluminum oxide. Lead-through conductors 4 extend through holes that are formed in the ceramic plate 1. A metallic gasket 5 in the form of a ring is arranged in an annular groove in the seal flange 2 to form a seal between the flange and the plate 1. A circular gasket 7 formed of polytetrafluoroethylene is mounted within an annular groove in the flange 3 to form a seal between the flange and the plate 1. A plurality of supports 8 in the form of pins are spaced around the circumference of the plate 1 to support the plate within the steel flanges 2 and 3. The supports 8 are preferably formed of polytetrafluoroethylene. The lead-through conductors 4 are sealed by metallic packings 11 and by gaskets 12 of polytetrafluoroethylene, which are supported within steel sleeves 13 that are held in place by washers 14 and nuts 15.

The chamber 9 on the inside of the steel flange 2 corresponds to the liquid helium chamber for cooling the superconductive excitation winding of a turbogenerator. The chamber 10 on the opposite side of the ceramic plate 1 corresponds to the high vacuum chamber of the turbogenerator. Thus, the lead-through conductor mounting arrangement of this invention is suitable for use in an environment where one side is subjected to very low temperature and high pressure (chamber 9), while the other side is subjected to very low pressure, but higher temperatures (chamber 10).

The metal gaskets and packing 5 and 11 correspond approximately to the rate of thermal expansion of the flange 2. The seals on the high temperature, low pressure side 10 are of a synthetic material which has a relatively large rate of thermal expansion in order to compensate for the relatively low rate of thermal expansion of the ceramic plate 1. As a result, the seals 7 and 12 and pins 8 prevent undesirable compressive stresses from developing in the plate, which could damage or destroy the plate.

While this invention has been illustrated and described with respect to a preferred embodiment, it is recognized that variations and changes may be made therein without departing from the invention, as set forth in the claims. For example, the gaskets 7 and 12 and pins 8 may be made of a material other than polytetrafluoroethylene that has a coefficient of thermal expansion that is relatively large in relation to that of the gaskets 5 and 11.

What is claimed is

1. A mounting arrangement for electrical lead-through conductors, comprising:
    wall means for separating a zone of high pressure, low temperature gas from a high vacuum zone, said wall means including:
    a ceramic plate having a hole therein;
    at least two metallic flanges, each of which is arranged adjacent one of two opposed sides of said plate to secure said plate in position therebetween;
    an electrical conductor extending through said hole in said plate;
    means for securing said conductor against movement relative to said plate;

a plurality of pins arranged between said flanges about a peripheral surface of said plate, which pins are manufactured from a synthetic material; and seal means between said flanges and said plate for sealing said high vacuum zone with respect to said zone of high pressure gas, said seal means adjacent said high vacuum zone having a larger coefficient of thermal expansion than the seal means adjacent said high pressure zone.

2. The mounting arrangement according to claim 1 wherein said seal means includes a gasket adjacent said high vacuum zone made of polytetrafluoroethylene.

3. The mounting arrangement according to claim 1 wherein the seal means includes a gasket adjacent the high vacuum zone which has a relatively high coefficient of thermal expansion to compensate for the relatively low rate of thermal expansion of the ceramic plate.

4. The mounting arrangement according to claim 1 wherein the seal means adjacent said high pressure zone has substantially the same coefficient of thermal expansion as said metallic flanges.

5. The mounting arrangement according to claim 1 including additional seal means between said ceramic plate and said electrical conductor, said additional seal means including a material having a relatively high coefficient of thermal expansion adjacent said high vacuum zone and including a material having a relatively low coefficient of thermal expansion adjacent said high pressure zone, whereby the combined expansion of said additional seal means adjacent said high vacuum zone and of said ceramic plate substantially corresponds to the coefficient of thermal expansion of said additional seal means adjacent said high pressure zone.

6. A mounting arrangement for electrical lead-through conductors, comprising:

wall means for separating a zone of high pressure, low temperature gas from a high vacuum zone, said wall means including:

a ceramic plate having a hole therein;

at least two metallic flanges, each of which is arranged adjacent one of two opposed sides of said plate to secure said plate in position therebetween;

an electrical conductor extending through said hole in said plate;

means for securing said conductor against movement relative to said plate;

a plurality of pins spaced around the circumference of said plate between said flanges, said pins being formed of polytetrafluoroethylene; and seal means between said flanges and said plate for sealing said high vacuum zone with respect to said zone of high pressure gas, said seal means adjacent said high vacuum zone having a larger coefficient of thermal expansion than the seal means adjacent said high pressure zone, and said seal means including a gasket adjacent said high vacuum zone made of polytetrafluoroethylene.

7. A mounting arrangement for electrical lead-through conductors, comprising:

wall means for separating a zone of high pressure, low temperature gas from a high vacuum zone, said wall means including:

a ceramic plate having a hole therein;

at least two metallic flanges, each of which is arranged adjacent one of two opposed sides of said plate to secure said plate in position therebetween;

an electrical conductor extending through said hole in said plate;

means for securing said conductor against movement relative to said plate;

a plurality of pins spaced around the perimeter of said plate between said flanges;

seal means between said flanges and said plate for sealing said high vacuum zone with respect to said zone of high pressure gas, said seal means adjacent said high vacuum zone having a larger coefficient of thermal expansion than the seal means adjacent said high pressure zone;

said ceramic plate being formed of aluminum oxide and said flanges being formed of steel;

said seal means including a sealing gasket adjacent said high vacuum zone manufactured from polytetrafluoroethylene, and a sealing gasket adjacent said high pressure zone manufactured from metal having substantially the same coefficient of thermal expansion as said flanges.

8. A mounting arrangement for electrical lead-through conductors, especially for turbogenerators having superconductive excitation windings, wherein the electric lead-through conductors extend from a zone of high pressure, low temperature gas to a high vacuum zone, comprising:

a ceramic plate having a hole therein;

an electrical conductor arranged within said hole and extending through said hole from a zone of high pressure, low temperature gas to a high vacuum zone;

at least two metallic flanges, each of which is arranged adjacent one of two opposed sides of said plate, said metallic flanges being fastened to each other and to said ceramic plate;

a plurality of pins arranged between said flanges about a peripheral surface of said plate, which pins are manufactured from a synthetic material; and seal means, arranged between said flanges and said plate and between said conductor and said plate, for sealing said high vacuum zone with respect to said zone of high pressure gas, said seal means including:

a metallic gasket arranged between said plate and one of the at least two metallic flanges positioned closest to said high pressure zone;

metallic packings, arranged between said electrical conductor and said plate, adjacent said high pressure zone;

a gasket, made from synthetic material, arranged between said plate and one of the at least two metallic flanges positioned closest to said high vacuum zone; and a gasket, made from synthetic material, arranged between said electrical conductor and said plate, adjacent said high vacuum zone.

\* \* \* \* \*